United States Patent

Nishikata et al.

[11] Patent Number: 5,956,177
[45] Date of Patent: Sep. 21, 1999

[54] CONVERTER FOR POLAR-AXIS TELESCOPE

[75] Inventors: Yasuhiro Nishikata, Tokyo; Tetsuya Abe, Hokkaido, both of Japan

[73] Assignee: Asahi Kogaku Kogyo Kabushiki Kaisha, Tokyo, Japan

[21] Appl. No.: 08/826,383

[22] Filed: Apr. 9, 1997

[30] Foreign Application Priority Data

Apr. 11, 1996 [JP] Japan .................................. 8-089577

[51] Int. Cl.⁶ .................................................. G02B 23/00
[52] U.S. Cl. ........................ 359/430; 359/399; 359/421
[58] Field of Search .................................. 359/421, 422, 359/429, 430, 399

[56] References Cited

U.S. PATENT DOCUMENTS

| | | | |
|---|---|---|---|
| 1,094,724 | 4/1914 | Konig | 359/421 |
| 1,553,211 | 9/1925 | Barr et al. | |
| 3,840,284 | 10/1974 | Rand | 359/430 |
| 4,436,421 | 3/1984 | Suzuki | 356/153 |
| 5,000,556 | 3/1991 | Katsuma | 359/407 |
| 5,121,220 | 6/1992 | Nakamoto | 359/419 |
| 5,589,976 | 12/1996 | Kanai et al. | 359/362 |

FOREIGN PATENT DOCUMENTS

| | | | |
|---|---|---|---|
| 2495337 | 6/1982 | France | 359/422 |
| 36-8859 | 4/1961 | Japan . | |

*Primary Examiner*—Cassandra Spyrou
*Assistant Examiner*—Mark A. Robinson
*Attorney, Agent, or Firm*—Greenblum & Bernstein, P.L.C.

[57] ABSTRACT

A converter for a polar-axis telescope includes an optical system which varies one of the field of view, angle of field, and magnification of the polar-axis telescope. A movable lens barrel is provided which holds the optical system such that the optical system can be moved into or out of the optical path of the polar-axis telescope. The converter may be detachably attached to a front end of the polar-axis telescope, or may be built into the polar-axis telescope. The converter lens system has a negative power and includes a negative lens group and a positive lens group.

5 Claims, 6 Drawing Sheets

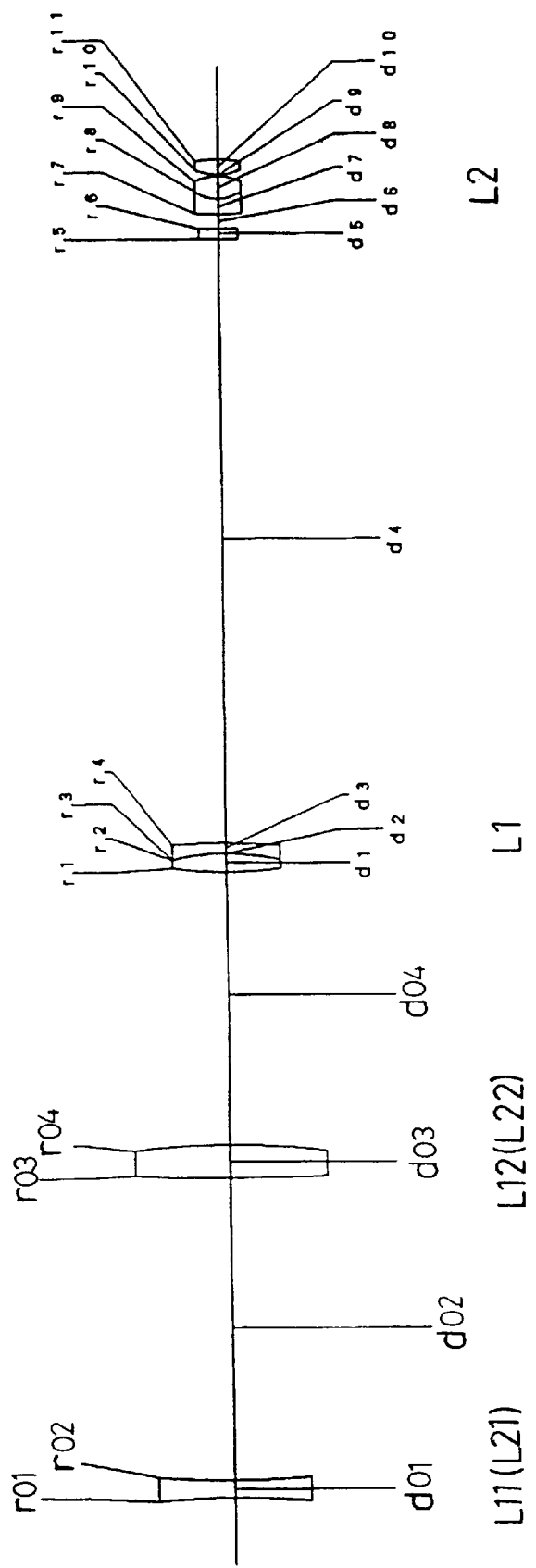

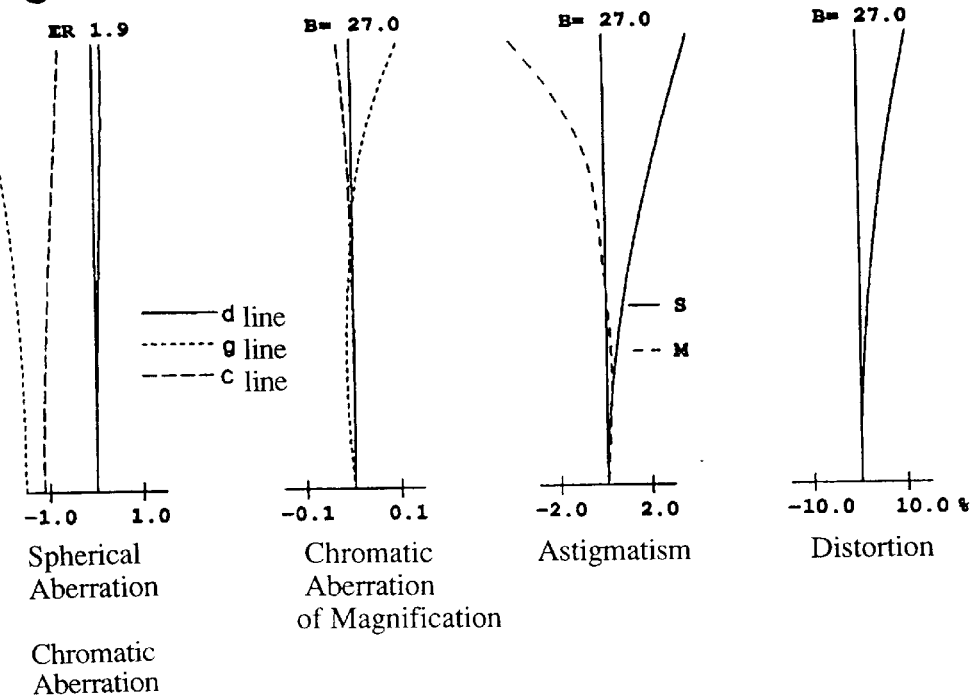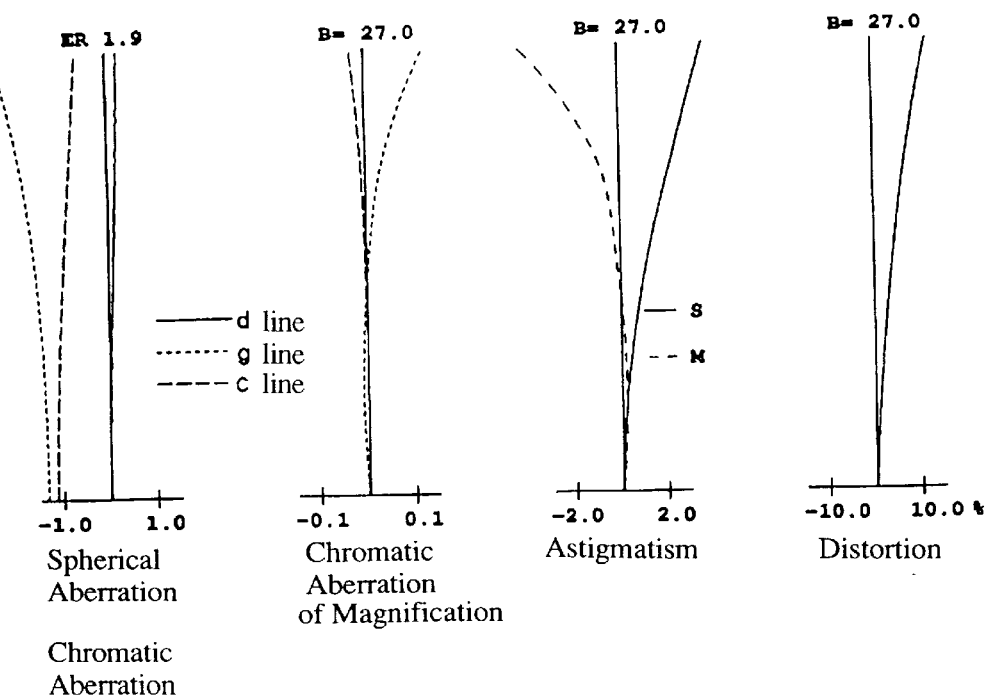

Spherical Aberration

Chromatic Aberration

Chromatic Aberration of Magnification

Astigmatism

Distortion

CONVERTER FOR POLAR-AXIS TELESCOPE

BACKGROUND OF THE INVENTION

1. Field of the Invention

The present invention relates to a converter for a polar-axis type astronomical telescope.

2. Description of the Related Art

In an equatorial telescope, the polar axis must be set parallel with the earth's axis. There is known an equatorial telescope having a polar-axis telescope in which the optical axis is identical to the polar axis to facilitate the setting operation of the polar axis. The setting operation of the polar axis of the equatorial telescope is carried out as follows. For instance, in the northern hemisphere, the Northern Star is viewed through the polar-axis telescope and the azimuth and the altitude of the equatorial telescope are adjusted so that the Polestar is located at a predetermined distance from the center of the field of view (optical axis) of the polar-axis telescope.

The number of astronomical observers is increasing who attach an electronic image pickup device (e.g., charge coupled device (CCD)) to the astronomic telescope to record an image on a video tape, such that the image can be retained for long periods of time. In particular, a need has surfaced for more precise setting of the polar axis in view of an increased precision of the electronic image pickup device (resolution or resolving power).

However, if the magnification of the polar-axis telescope is increased, the field of view of the polar-axis telescope is reduced, so that it is difficult to capture the Polestar using the polar-axis telescope. If the magnification of the polar-axis telescope is reduced, the field of view is widened, so that an observer can easily capture the Polestar, but the precision of the setting operation of the polar axis is reduced.

SUMMARY OF THE INVENTION

It is an object of the present invention to provide a converter for a polar-axis telescope in which an aiming star (Polestar) or constellation can be easily caught and the polar axis can be precisely set.

To achieve the object mentioned above, according to the present invention, a converter having an optical system which varies the focal length of an objective lens of the polar-axis telescope moved into or retracted from the light path of the polar-axis telescope.

Preferably, the converter is detachably attached to the front end of the polar-axis telescope. The absence or presence of the converter can be easily determined based on the appearance of the polar-axis telescope. The detachability of the converter makes it possible to easily select the observation through the polar-axis telescope without the converter, or observation through the polar-axis telescope having the converter attached to vary the field of view or the magnification.

If the converter is incorporated in the equatorial telescope having the polar-axis telescope and is moved between an operative position in which the converter is located within the light path of the polar-axis telescope and a retracted position in which the converter is retracted from the light path, it is not necessary to store or carry the converter separately from the polar-axis telescope.

If the converter is comprised of a lens system which reduces the magnification of the polar-axis telescope and expands the field of view and the angle of the field, it is possible to easily capture, for example, the Polestar within the increased angle of view. After the Polestar is captured, the converter is retracted from the light path of the polar-axis telescope, so that a precise setting operation of the polar axis can be performed by the high-magnification polar-axis telescope.

The present disclosure relates to subject matter contained in Japanese Patent Application No. 08-89577 (filed on Apr. 11, 1996) and which is expressly incorporated herein by reference in its entirety.

BRIEF DESCRIPTION OF THE DRAWINGS

The invention will be described below in detail with reference to the accompanying drawings, in which;

FIG. 4 is a schematic view of a lens arrangement of a polar-axis telescope to which a front converter is attached;

FIGS. 5A, 5B, 5C and 5D show aberration diagrams of a polar-axis telescope to which a first embodiment of a front converter is attached;

FIGS. 6A, 6B, 6C and 6D show aberration diagrams of a polar-axis telescope to which a second embodiment of a front converter is attached; and, FIGS. 7A, 7B, 7C and 7D show aberration diagrams of the single polar-axis telescope shown in FIG. 4.

DESCRIPTION OF THE PREFERRED EMBODIMENT

Figure 1:
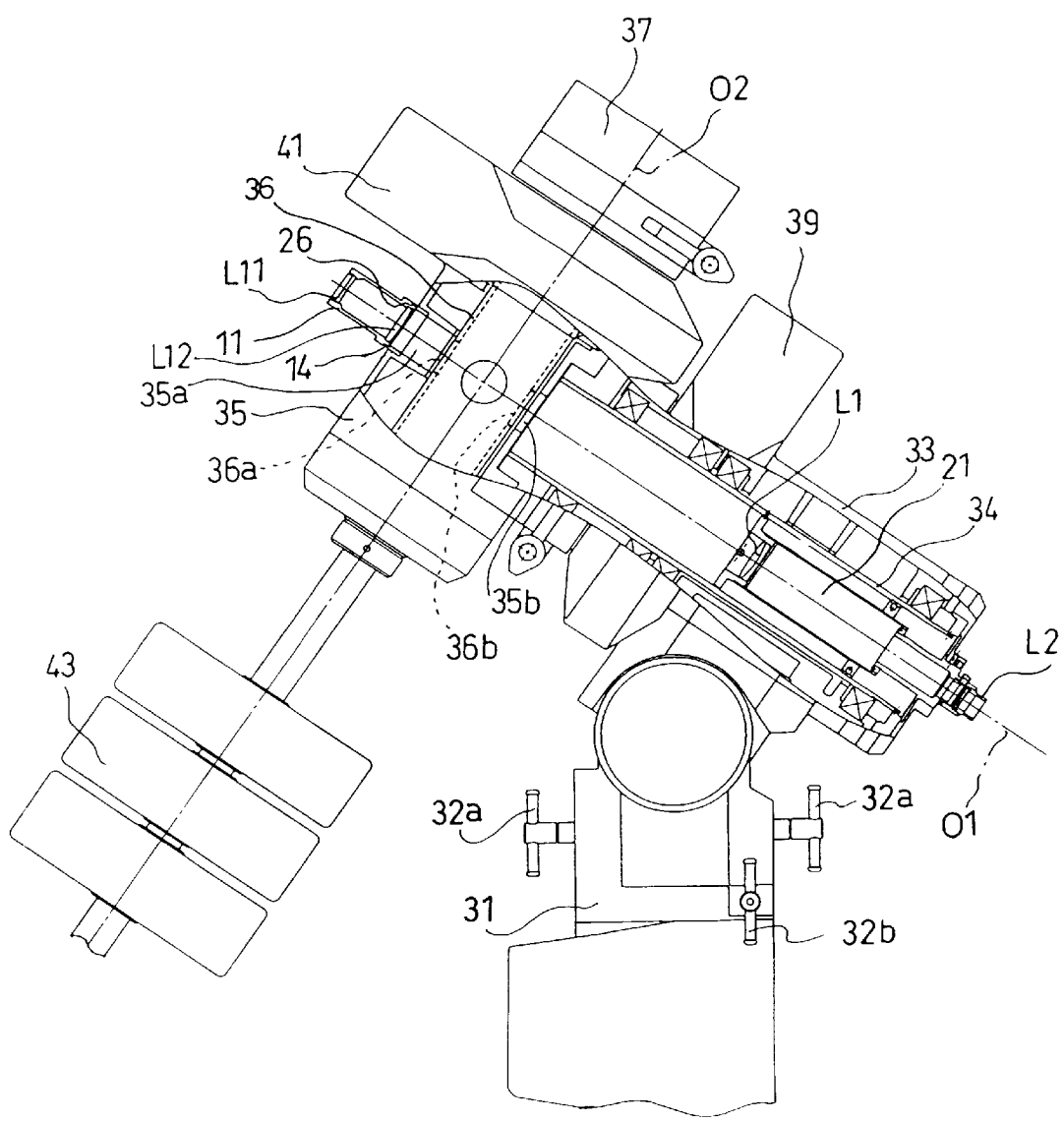
FIG. 1 is a partially broken side view of an equatorial telescope having a polar-axis telescope to which a detachable front converter is attached, according to the present invention.
Figure 2:
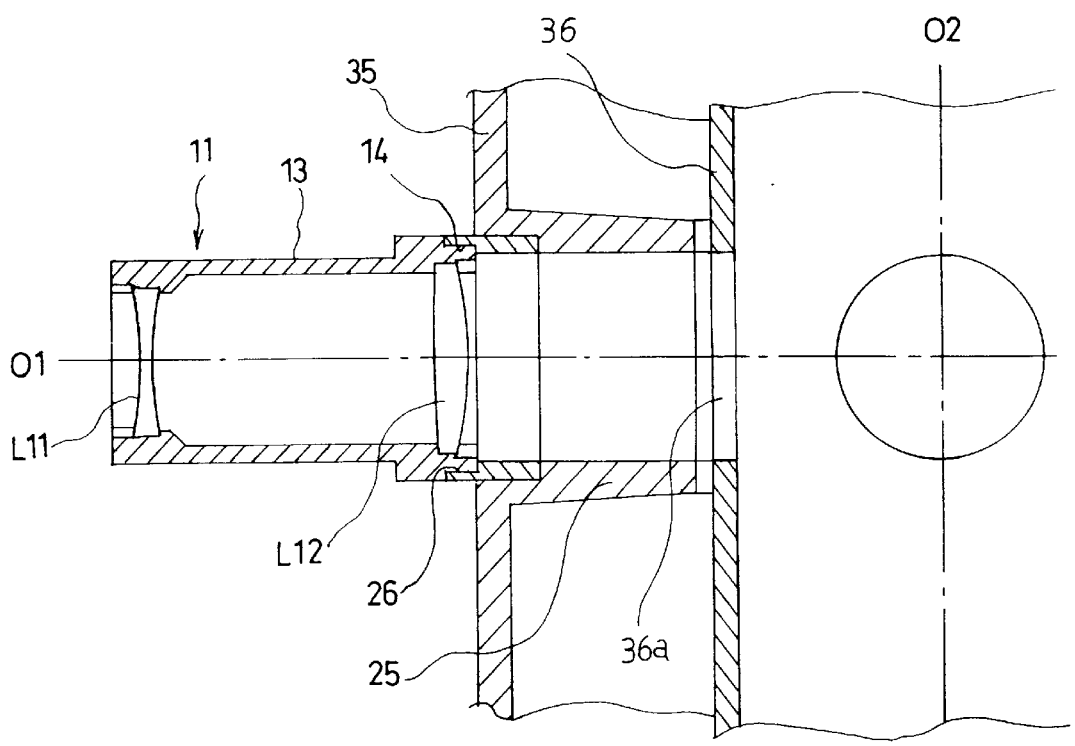
FIG. 2 is an enlarged sectional view of the front converter shown in FIG. 1.
Figure 3:
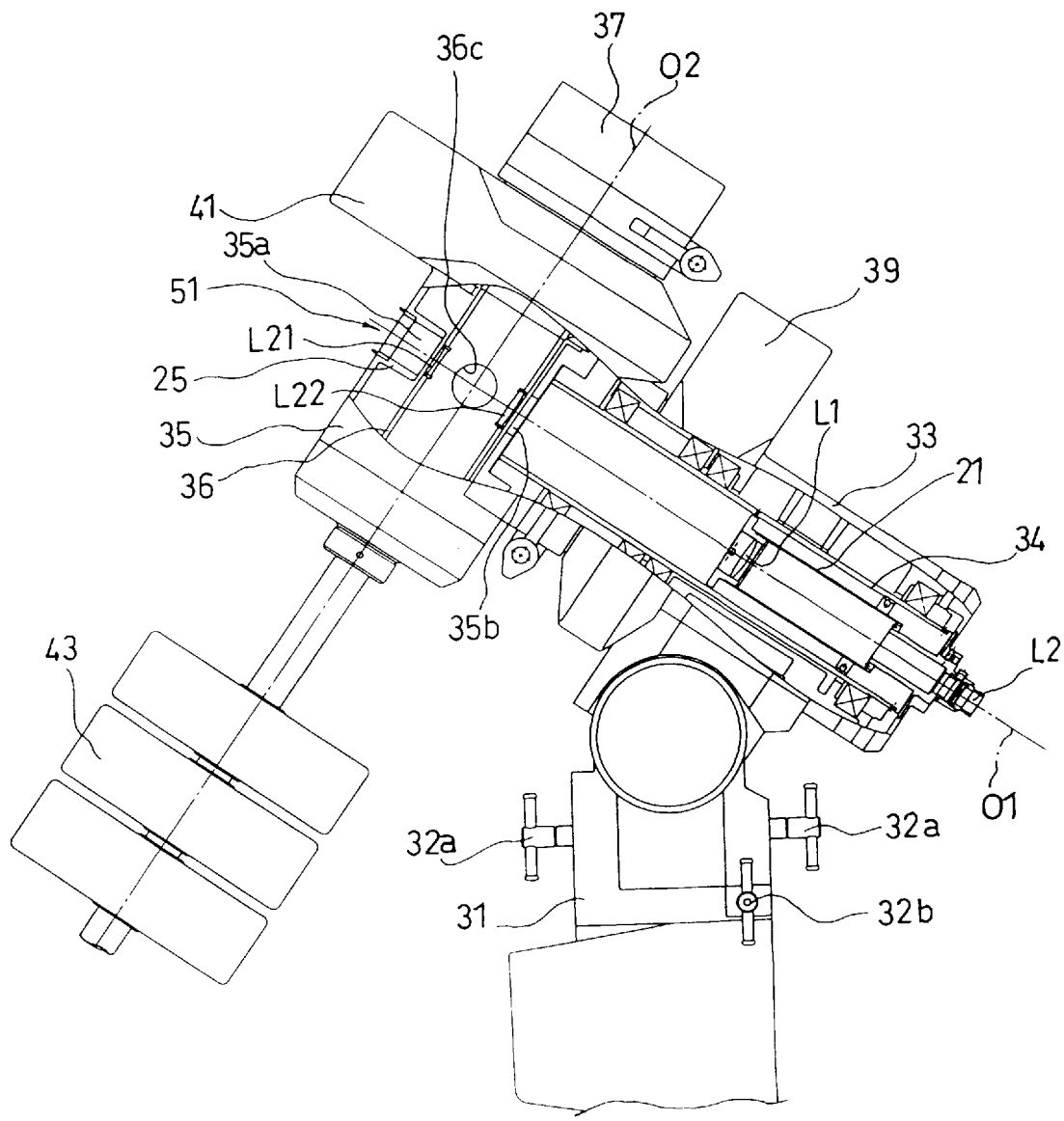
FIG. 3 is a partially broken side view of an equatorial telescope having a front converter incorporated therein, according to a second embodiment of the present invention.
Figure 7A:
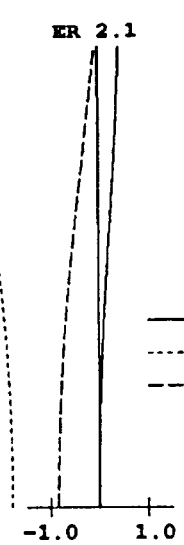
Figure 7B:
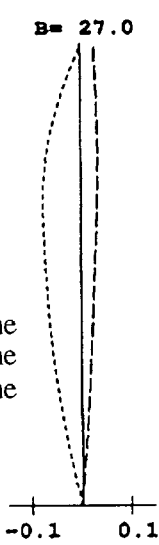
Figure 7C:
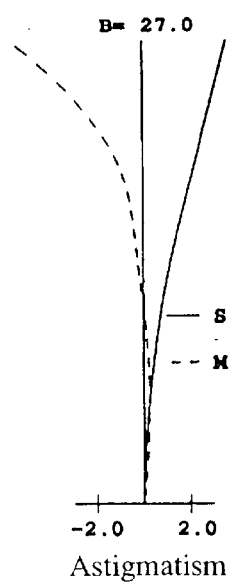
Figure 7D:
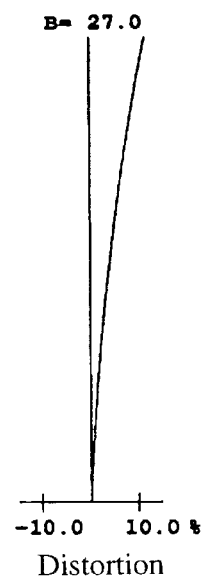

FIGS. 1 and 3 show partially broken side views of an equatorial telescope having a polar-axis telescope to which different embodiments of the present invention are applied. In FIG. 1, the converter is detachably attached to the equatorial telescope and in FIG. 3, the converter is built into the equatorial telescope, respectively. FIG. 2 shows an enlarged sectional view of the detachable converter shown in FIG. 1.

The equatorial telescope to which the present invention is applicable is provided with a support 31 which can be attached to a tripod (not shown) and which is provided with a polar-axis outer cylinder 33 which is pivoted to the support 31 so as to adjust the altitude (vertical rotation) and the azimuth (horizontal rotation). The outer cylinder 33 is provided with a polar-axis inner cylinder 34 which is rotatable about the polar axis 01. The inner cylinder 34 is provided at the front end with a declination outer cylinder 35 secured thereto. The declination outer cylinder 35 is provided with a declination inner cylinder 36 which is rotatable about the declination axis 02 perpendicular to the polar axis 01. The axis of the declination outer cylinder 35 is identical to the declination axis 02. A mount 37 is attached to the front end of the declination outer cylinder 35 so as to rotate about the declination axis 02. An astronomical telescope (not shown) can be secured to the mount 37.

The polar-axis telescope 21 is comprised of a first lens group (objective lens group) L1 and an eyepiece lens group L2. A focusing plate (not shown) provided between the first lens group L1 and the ocular lens group L2 is provided with a scale which is adapted to determine an aiming star. Upon setting the polar axis, the observer adjusts an altitude fine adjustment screw 32a and an azimuth fine adjustment screw 32b to adjust the altitude (vertical adjustment) and azimuth (horizontal adjustment) of the polar-axis telescope 21 (polar axis 01), so that the Polestar is coincidental with the scale, while viewing the Polestar which is overlapped on the scale of the focusing plate through the eyepiece group L2.

The polar-axis telescope 21, whose optical axis is identical to the polar axis 01, is provided in the polar-axis inner cylinder 34. The declination outer cylinder 35 and the declination inner cylinder 36 are provided with openings 35a, 35b, 36a and 36b along the light path of the polar-axis telescope 21 to obtain a sufficient field of view of the polar-axis telescope 21.

Note that reference numeral 39 designates the polar axis drive portion which rotates the declination outer cylinder 35 about the polar axis 01, the declination drive portion 41 which rotates the mount 37 about the declination axis 02, and 43 the balance weight, respectively.

A converter mounting cylinder 25 which serves also as a hood for the polar-axis telescope 21 is secured to the opening 35a formed in the declination outer cylinder 35. In the illustrated embodiment, the converter mounting cylinder 25 is provided on the inner peripheral surface with an internal thread 26.

The barrel 13 of the front converter 11 is provided, on the outer peripheral surface of the rear end thereof, with an external thread 14 which can be engaged by the internal thread 26 (FIG. 2). Namely, the front converter 11 is attached to the front end of the polar-axis telescope 21 when the external thread 14 engages with the internal thread 26. The connection of the front converter 11 and the polar-axis telescope 21 is not limited to the screw engagement and can be established, for example, using a bayonet-type connection.

The front converter 11, when attached to the front end of the polar-axis telescope 21, functions as a wide converter to reduce the magnification and to expand the field of view of the polar-axis telescope 21. The lens arrangement has a negative power as a whole and is comprised of a first negative lens group L11 and a second positive lens group L12, in this order from the celestial body side.

The equatorial telescope is used as follows.

An observer attaches the front converter 11 to the front end of the polar-axis telescope 21 to widen the field of view of the polar-axis telescope, and then directs the polar-axis telescope 21 toward the Polestar. Thereafter, the observer captures the constellation (e.g., The Great Bear) through the eyepiece lens group L2 and performs a coarse adjustment of the altitude (vertical adjustment) and azimuth (horizontal adjustment) of the polar-axis telescope 21 so that the Polestar is located near the center of the field of view.

When the Polestar is located near the center of the field of view, the front converter 11 is detached from the polar-axis telescope 21, so that the observation can be effected by the polar-axis telescope at a high magnification assigned thereto. The observer views the Polestar which is overlapped on the scale of the focusing plate 23, through the eyepiece lens group L2 and adjusts the altitude fine adjustment screw 32a and the azimuth fine adjustment screw. 32b to adjust the altitude and azimuth of the polar axis outer cylinder 33 so that the Polestar coincides with the scale.

In the equatorial telescope having the polar-axis telescope 21 constructed as shown in FIGS. 1 and 2, upon setting the polar axis thereof, the front converter 11 is mounted to the polar-axis telescope 21 to reduce the magnification of the polar-axis telescope to widen the field of view, whereby the Polestar can be easily captured. After the Polestar is captured, the front converter 11 is removed from the polar-axis telescope, so that high magnification that the polar-axis telescope 21 originally possesses can be obtained. Namely, it is possible for an observer to observe the Polestar through the precise polar-axis telescope having a high magnification, and hence a precise setting operation of the polar axis can be carried out.

FIG. 3 shows another embodiment of the present invention in which the equatorial telescope 20 has a built-in front converter. In FIG. 3, the elements corresponding to those in FIG. 1 are designated with like reference numerals, and thus, an explanation thereof will be omitted.

In the second embodiment, the front converter 51 is attached to the openings 36a and 36b of the declination axis inner cylinder 36. The front converter 51 serves as a wide converter to reduce the magnification and to expand the field of view of the polar-axis telescope 21. The lens system of front converter has a negative power as a whole and is comprised of a first negative lens group L21 and a second positive lens group L22, in this order from the celestial body side.

In the second embodiment, the declination axis inner cylinder 36 is rotatable about the declination axis 02. The declination axis inner cylinder 36 is provided with openings 36c (only one of which is shown in FIG. 3) which are diametrically opposed with respect to the declination axis 02. The openings 36c can be opposed to the openings 35a and 35b of the declination axis outer cylinder 35. Namely, the front converter 51 or the openings 36c are selectively located in front of the polar-axis telescope 21 by rotating the declination axis inner cylinder 36. When the front converter 51 is opposed to the polar-axis telescope 21, the field of view of the polar-axis telescope 21 is expanded by the first and second lens groups L12 and L22 of the front converter 51 to enable the observer to easily capture the Polestar. When the openings 36c are opposed to the polar-axis telescope 21, the observation is effected through the polar-axis telescope 21 only, and hence, a precise setting of the polar axis can be carried out.

In the second embodiment, the declination axis inner cylinder 36 supports the mount 37 and is rotated by the declination axis drive portion 41 together with the mount 37. Namely, when the declination axis inner cylinder 36 is rotated by the declination axis drive portion 41, the front converter 51 or the openings 36c are selectively opposed to the polar-axis telescope 21.

Several embodiments of the lens arrangements of the front lens converter and the polar-axis telescope will be discussed below. FIG. 4 shows the lens arrangement when the front lens converter 52 is disposed in front of the polar-axis telescope. In the tables below, "r" designates the radius of curvature (mm) measured from the eyepiece side, "D" the instance (mm) between the lens surfaces, "N" the refractive index at the D-line, "vD" the Abbe number at the D-line, and "W" the incident angle (°), respectively.

<Embodiment 1>

Table 1 below shows numerical data of a lens arrangement when the front converter 11 according to the present invention is attached to the polar-axis telescope 21, and FIGS. 5A, 5B, 5C and SD show aberration diagrams thereof. In the aberration diagrams, "B" designates the emission angle, and "E.R" the radius of the exit pupil.

TABLE 1

| No. | r | d | N(D) | νD |
|---|---|---|---|---|
| 01 | −127.801 | 2.50 | 1.51742 | 52.4 |
| 02 | 127.801 | 45.60 | — | — |
| 03 | 334.554 | 5.00 | 1.48749 | 70.2 |
| 04 | −111.377 | 320.00 | — | — |
| 1 | 114.500 | 5.50 | 1.51633 | 64.1 |
| 2 | −66.762 | 0.08 | — | — |
| 3 | −67.433 | 3.00 | 1.62004 | 36.3 |
| 4 | −269.221 | 181.27 | — | — |
| 5 | ∞ | 3.00 | 1.51633 | 64.1 |
| 6 | ∞ | 4.25 | — | — |
| 7 | 75.596 | 4.69 | 1.80518 | 25.4 |
| 8 | 11.041 | 6.89 | 1.60311 | 60.7 |
| 9 | −16.160 | 0.50 | — | — |
| 10 | 16.160 | 4.67 | 1.60311 | 60.7 |
| 11 | −36.200 | — | — | — |

W = 2.4

<Embodiment 2>

Table 2 below shows numerical data of a lens arrangement when the front converter 11 according to another embodiment of the present invention is attached to the polar-axis telescope 21, and FIGS. 6A, 6B, 6C and 6D show aberration diagrams thereof.

TABLE 2

| No. | r | d | N(D) | νD |
|---|---|---|---|---|
| 01 | −165.206 | 2.50 | 1.51742 | 52.4 |
| 02 | 165.206 | 62.50 | — | — |
| 03 | 537.090 | 5.00 | 1.48749 | 70.2 |
| 04 | −137.596 | 208.00 | — | — |
| 1 | 114.500 | 5.50 | 1.51633 | 64.1 |
| 2 | −66.762 | 0.08 | — | — |
| 3 | −67.433 | 3.00 | 1.62004 | 36.3 |
| 4 | −269.221 | 181.27 | — | — |
| 5 | ∞ | 3.00 | 1.51633 | 64.1 |
| 6 | ∞ | 4.25 | — | — |
| 7 | 75.596 | 4.69 | 1.80518 | 25.4 |
| 8 | 11.041 | 6.89 | 1.60311 | 60.7 |
| 9 | −16.160 | 0.50 | — | — |
| 10 | 16.160 | 4.67 | 1.60311 | 60.7 |
| 11 | −36.200 | — | — | — |

W = 2.5

Table 3 below shows lens data of a polar-axis telescope having no front converter and FIGS. 7A, 7B, 7C and 7D shows aberration diagrams thereof.

TABLE 3

| No. | r | d | N(D) | νD |
|---|---|---|---|---|
| 1 | 114.500 | 5.50 | 1.51633 | 64.1 |
| 2 | −66.762 | 0.08 | — | — |
| 3 | −67.433 | 3.00 | 1.62004 | 36.3 |
| 4 | −269.221 | 181.27 | — | — |
| 5 | ∞ | 3.00 | 1.51633 | 64.1 |
| 6 | ∞ | 4.25 | — | — |
| 7 | 75.596 | 4.69 | 1.80518 | 25.4 |
| 8 | 11.041 | 6.89 | 1.60311 | 60.7 |
| 9 | −16.160 | 0.50 | — | — |
| 10 | 16.160 | 4.67 | 1.60311 | 60.7 |
| 11 | −36.200 | — | — | — |

W = 1.8

As can be seen from Tables 1 through 3 and FIGS. 5 through 7, the front converter 11 enlarges the field of view without deteriorating the aberrations of the polar-axis telescope.

Since the converter is a wide converter in the present invention, the coarse adjustment is carried out when the converter is attached and the fine adjustment is carried out when no converter is attached. Thus, a quick coarse adjustment and a precise setting operation of the polar axis depending on the precision of the polar-axis telescope can be achieved. Namely, when the present invention is applied to the polar-axis telescope, even if the field of view thereof is narrow, the Polestar can be observed using the field of view of the polar-axis telescope which is enlarged by the converter, and hence the Polestar can be easily captured. Moreover, when the converter is removed, the setting operation of the polar axis can be precisely performed using the polar-axis telescope that possesses a high magnification, without producing aberrations by the converter or deteriorating the aberrations or precision.

Although the illustrated embodiments are applied to a wide converter, a tele-converter can be used instead if the magnification of the polar-axis telescope is low. In this case, the tele-converter is attached to the polar-axis telescope for a fine adjustment, so that the setting operation of the polar axis can be performed while observing the Polestar at higher magnification, Moreover, it is possible to prepare both the tele-converter and the wide converter or a plurality of converters having different magnifications.

As can be understood from the above discussion, according to the present invention, since the converter can be attached to the polar-axis telescope to vary the field of view and the magnification of the polar-axis telescope, the appropriate field of view or magnification can be easily selected in accordance with the coarse adjustment to capture the aiming star, for example, the Polestar or the fine adjustment to precisely set the polar axis.

Moreover, in an embodiment, since the converter can expand the field of view of the polar-axis telescope to which the converter is attached, the observer can easily capture the Polestar within the field of view of the polar-axis telescope. When the converter is detached from the polar-axis telescope, the magnification that the polar-axis telescope originally possesses can be automatically obtained, so that a precise setting operation of the polar axis can be performed.

What is claimed is:

1. A converter for a polar-axis telescope, said converter comprising:

an optical system which varies one of a field of view, an angle of field, and a magnification of said polar-axis telescope; and a lens barrel which holds said optical system to be movable into and out of an optical path of said polar-axis telescope, wherein said polar-axis telescope is attached to a cylindrical polar-axis portion of an equatorial telescope, the equatorial telescope comprising said cylindrical polar-axis portion and a declination outer cylinder, said declination outer cylinder having an axis perpendicular to a polar axis of said cylindrical polar-axis portion and being secured to a front end of said cylindrical polar-axis portion, wherein said converter is supported in said declination outer cylinder to move between an operative position in which said converter is located within said optical path of said polar-axis telescope, and a retracted position in which said converter is retracted from said optical path.

2. A converter for a polar-axis telescope according to claim 1, wherein said converter is attached within a declination inner cylinder provided in said declination outer cylinder and rotatable about said declination axis, so that said rotation of said declination inner cylinder moves said converter between said operative position and said retracted position.

3. A converter for a polar-axis telescope according to claim 2, wherein said declination outer cylinder is provided with an opening to pass incident light to said optical path of said polar-axis telescope, and said declination inner cylinder is provided with an opening to pass incident light to said optical path of said polar-axis telescope when said converter is retracted from said optical path of said polar-axis telescope.

4. A converter for a polar-axis telescope according to claim 2, wherein said converter comprises a lens system of negative power including a negative lens group and a positive lens group, in this order from an object side.

5. A converter for a polar-axis telescope according to claim 4, wherein said converter enlarges said field of view of said polar-axis telescope.

* * * * *